(12) United States Patent
Shahi

(10) Patent No.: US 8,175,836 B2
(45) Date of Patent: May 8, 2012

(54) FLOW ESTIMATION FOR FLUID HANDLING SYSTEM

(75) Inventor: Prakash B. Shahi, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 900 days.

(21) Appl. No.: 12/212,756

(22) Filed: Sep. 18, 2008

(65) Prior Publication Data

US 2010/0070205 A1    Mar. 18, 2010

(51) Int. Cl.
*G01F 1/00* (2006.01)

(52) U.S. Cl. .......... 702/100; 702/41; 702/145; 318/430; 318/432; 318/400.07; 318/400.08

(58) Field of Classification Search .................. 702/100, 702/41, 145; 318/430, 432, 400.07, 400.08; 417/1

See application file for complete search history.

(56) References Cited

U.S. PATENT DOCUMENTS

| | | | |
|---|---|---|---|
| 6,321,732 B1 | 11/2001 | Kotwicki et al. | |
| 6,760,656 B2 | 7/2004 | Matthews et al. | |
| 7,027,905 B1 | 4/2006 | Mladenovic et al. | |
| 2007/0248467 A1 * | 10/2007 | Shahi et al. ........................ | 417/1 |

\* cited by examiner

*Primary Examiner* — Drew A Dunn
*Assistant Examiner* — Hien Vo
(74) *Attorney, Agent, or Firm* — Senniger Powers LLP

(57) ABSTRACT

A method of estimating airflow for a characterized blower system including a motor. The method includes running the motor, estimating a torque and a speed of the running motor, and assuming a starting airflow estimate. Torque is calculated based on the estimated speed and the estimated airflow. A torque error is calculated as a function of the calculated torque and the estimated torque. Estimated airflow is revised based on the calculated torque error. The method also includes repeating the calculating and revising steps using the revised estimated airflow until the torque error is within a predetermined acceptable range.

18 Claims, 2 Drawing Sheets

FLOW ESTIMATION FOR FLUID HANDLING SYSTEM

BACKGROUND

This disclosure generally relates to blower systems (also referred to as air handling systems) and other fluid handling systems, and more particularly to controls for such systems.

Heating, ventilation and/or air conditioning ("HVAC") systems commonly have blower systems for moving air. These blower systems typically include a fan (such as a squirrel cage fan), an electric motor for powering the fan, and a control for the electric motor. In some systems, the control receives a signal corresponding to airflow demand from a system controller, such as a thermostat. Variable speed motors are preferred over fixed speed motors because they can be programmed to provide a constant airflow over a range of system static pressures. Static pressure varies in the system due to system changes such as obstructed filters and dust build up. The variable speed motor controls may relay on an equation or a data table to control the speed or torque of the motor to provide generally constant airflow.

A variety of methods is used to characterize a system so that airflow demands can be converted to torque demands. For example, U.S. Pat. Appn. Pub. No. 2007/0248467 A1 describes a method for producing a torque demand from an airflow demand using an equation such as:

$$T = K1 + K2*s + K3*A + K4*s*A^2, \qquad (1)$$

where T represents the torque demand in Newton meters (Nm), s represents motor speed in revolutions per minute (rpm) and A represents the airflow demand in cubic feet per minute (cfm). K1, K2, K3 and K4 are constants derived for a particular blower system. These constants are derived from torque, speed and airflow data collected for the particular blower system. Other equations (e.g., higher order equations) may be used to calculate airflow demands from torque demands. Regardless of the particular equation used, constants must generally be determined for each system because the constants vary with various system parameters such as the size and make of the fan, fan housing and the system as a whole. The process of determining constants for a system is referred to as system characterization. This type of motor control provides reasonably constant airflow close to the demanded airflow when the motor is within it normal operating window. But when the motor operates in a limit condition, such as a speed limit, a power limit or a temperature limit, the delivered airflow can be much less than the demanded airflow. Smaller than required airflows can reduce the effectiveness of the air handling system, and under some circumstances delivering too little air can damage the system, rendering it inoperable. Knowing the actual airflow may also allow the system controller to forewarn certain system malfunctions. It may also allow the system controller to operate the heating and cooling system in a modified way to avoid over heating or over draft conditions.

In the past, when air handling systems were run in constant airflow mode, the airflow being delivered was assumed to be the demanded airflow. But when the motor was operated at limit conditions such as when the speed limit, torque limit or power limit of the motor was reached, the actual airflow was sometimes much lower than the demanded airflow. When the system was run in constant torque or speed mode of operation, airflow was not estimated. Thus, systems running in constant torque or speed mode did not provide enough airflow as the system static increased. With the airflow estimation, systems running in speed or torque mode can be controlled to maintain a required airflow. Although airflow could be measured using a airflow sensor, using an airflow sensor in duct work is costly and unreliable.

SUMMARY

In one aspect, the present invention includes a method of estimating airflow for a characterized blower system including a motor. The method comprises running the motor, estimating a torque and a speed of the running motor, and assuming a starting airflow estimate. In addition, the method includes calculating torque based on the estimated speed and the estimated airflow, and calculating a torque error as a function of the calculated torque and the estimated torque. Estimated airflow is revised based on the calculated torque error. The calculating and revising steps are repeated until the torque error is within a predetermined acceptable range.

In another aspect, the present invention includes a method of estimating airflow for a characterized blower system including a motor. The method comprises running the motor, estimating a torque and a speed of the running motor, and assuming a starting airflow estimate. The method also includes calculating torque based on the estimated speed and the estimated airflow, calculating a torque error by subtracting the calculated torque from the estimated torque, and calculating a correction factor based on the torque error. Estimated airflow is revised by adding the correction factor to the previously estimated airflow. The calculating and revising steps are repeated until the torque error is within a predetermined acceptable range.

In still another aspect, the present invention includes a method of estimating flow for a characterized fluid handling system including a motor. The method comprises running the motor, and calculating fluid flow based on a torque and a speed of the motor.

Other aspects of the present invention will be in part apparent and in part pointed out hereinafter.

BRIEF DESCRIPTION OF DRAWINGS

Corresponding reference characters indicate corresponding parts throughout the several views of the drawings.

DETAILED DESCRIPTION

Figure 1:
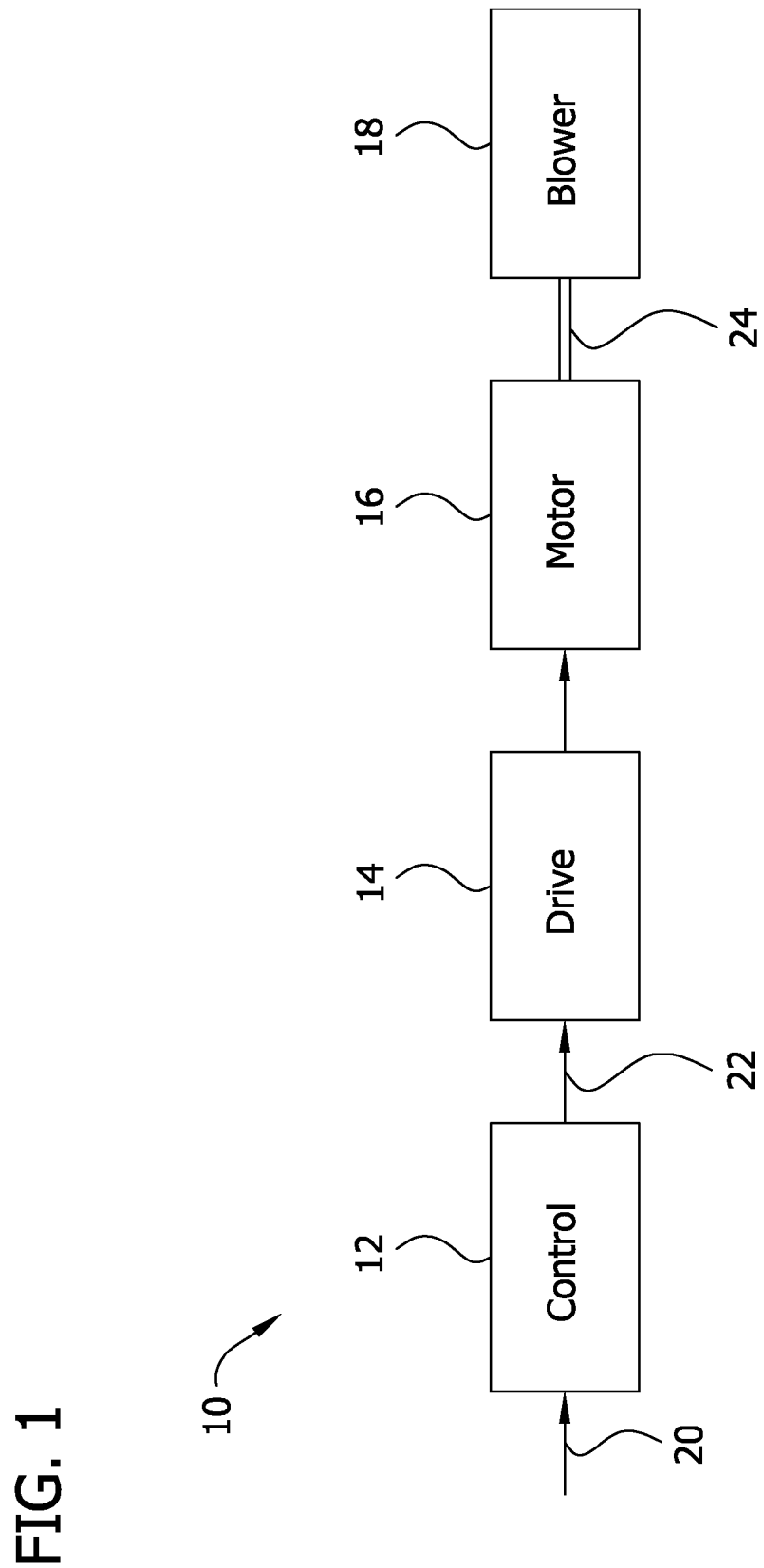
FIG. 1 is a block diagram of a blower system according to one embodiment of the present disclosure.

As illustrated in FIG. 1, a blower system according to one embodiment of the present invention is designated in its entirety by the reference number 10. The blower system 10 includes a blower control 12, a motor drive 14, an electric motor 16 and a blower 18. The control 12 receives an airflow demand signal 20 from a system controller (not shown) such as a thermostat or multi-system controller. The control 12 produces a drive signal 22 for the motor 16 based on the airflow demand signal 20 using an equation having several terms. In one embodiment, these terms include a composite function such as $s*A^n$, where s is a speed of the electric motor in revolutions per minute (rpm), A is airflow demand in cubic feet per minute (cfm), and n is a whole number greater than one. By using such an equation for calculating a drive signal 22 from the airflow demand signal 20, the control 12 can more accurately account for non-linearities between the airflow demand and other system parameters.

As further illustrated in FIG. 1, the control 12 provides the drive signal 22 to the drive 14. The drive 14 energizes the electric motor 16 to rotate its output 24 in accordance with the drive signal 22. When the motor 16 is energized, its output 24 rotates, driving the blower 18 for blowing air. In some embodiments, the blower 18 is a squirrel cage fan. Although not shown in FIG. 1, the control 12 may receive feedback from the motor 16 indicating motor speed, output torque and/or position (e.g., rotor position). Although the control 12, the drive 14 and the motor 16 are depicted as physically separate components in FIG. 1, those skilled in the art will appreciate that some or all of these components may be combined in a single package without departing from the scope of the present invention. As will also be apparent to those skilled in the art, the blower system 10 of FIG. 1 is well suited for HVAC and other applications.

Figure 2:
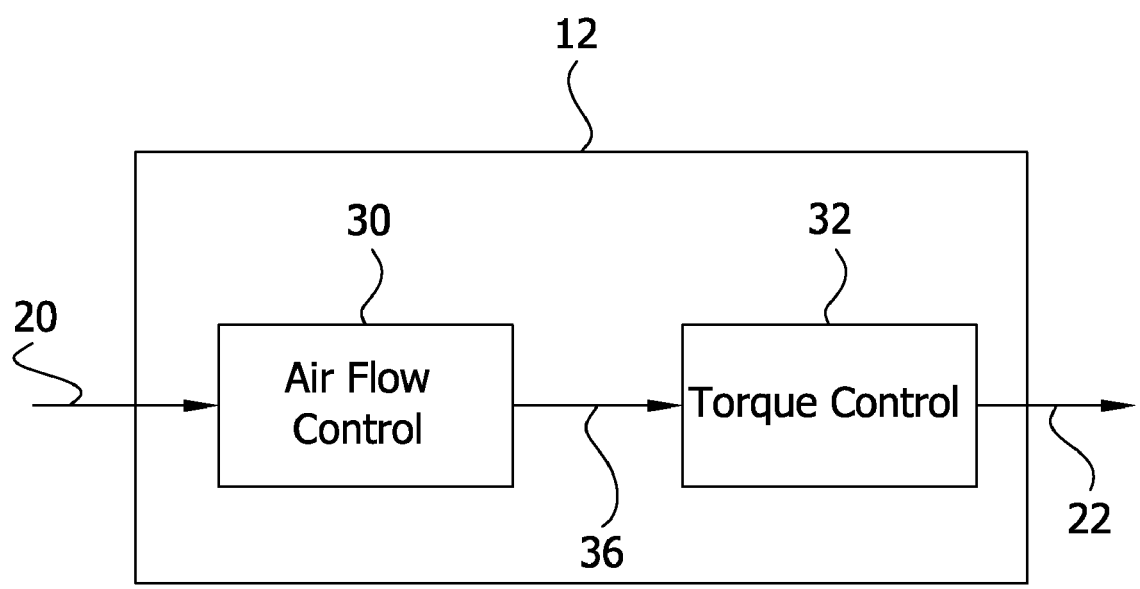
FIG. 2 is a block diagram of the control of FIG. 1 according to one particular embodiment.

FIG. 2 illustrates one embodiment of the control 12 shown in FIG. 1. In the embodiment of FIG. 2, the control 12 includes an airflow control module 30 and a torque control module 32. As shown in FIG. 2, the airflow control module 30 converts the received airflow demand signal 20 into a torque demand signal 36. The torque control module 32 converts the torque demand signal 36 into a drive signal 22 for the demanded motor torque. The airflow control module 30 is configured to produce the torque demand signal 36 using an equation having several terms as described above. As will be apparent to those skilled in the art, the control modules 30, 32 generally illustrated in FIG. 2 can be implemented in hardware or software in a variety of manners. For example, in some embodiments, the control modules are implemented using digital signal processors.

In one exemplary embodiment of the present invention, coefficients are determined for the particular blower system. As mentioned above, U.S. Pat. Appn. Pub. No. 2007/0248467 A1 describes a few methods for characterizing a blower system. The entire disclosure of this publication is incorporated by reference. The described methods involve determining system coefficients using a regression analysis on test data obtained from a particular system. Alternatively, formula commonly understood by those skilled in the art may be used to calculate generic coefficients without running experiments. As described previously, the characterized system may have an offset difference between the demanded airflow and the actual airflow delivered by the system due to changes in the system and ambient conditions. For example, a clogged filter may decrease actual airflow delivered. The following methods may be used to at least partially correct airflow so the characterized system can be restored to more efficient operation.

A first method of estimating airflow for a characterized blower system may be used on a system that can be accurate characterized using a torque demand equation such as:

$$T = K1 + K2*s + K3*A, \quad (2)$$

where T represents the torque demand in Newton meters (Nm), s represents motor speed in revolutions per minute (rpm) and A represents the airflow demand in cubic feet per minute (cfm). K1, K2 and K3 are constants derived for a particular blower system. These constants are derived from torque, speed and airflow data collected for the particular blower system. The constants may be determined using regression analysis as described in U.S. Pat. Appn. Pub. No. 2007/0248467 A1. Some systems may be reasonably characterized using equation (2). Solving equation (2) for airflow provides an alternate equation:

$$A = (T - K1 + K2*s)/K3, \quad (3)$$

Using this equation, the airflow A may be estimated directly from the torque T and motor speed s once the system is characterized and the constants are known. But if the blower equation is more complicated, for example as described in equation (1), this method of estimating airflow becomes difficult.

A second method of estimating airflow for a characterized blower system may be used on a system for which airflow data has been collected at different speeds and torques. These data may be tabulated and airflow may be estimated by interpolating between the tabulated data. But to accurately estimate airflow over a broad range of motor torques and speeds, many data points must be collected and stored. The quantity of data needed to accurately estimate airflow may be difficult to embed in motor controls.

In a third method, airflow is estimated and torque is then estimated using a blower torque equation such as those described above. The torque estimated from the blower equation is compared with an estimated motor torque calculated using conventional techniques. The difference in estimated torques is used to improve the airflow estimate. This method is iteratively performed until the difference between estimated torques is within a desired range. The estimated airflow when the torque difference is within the desired range is a reasonably good estimate of actual airflow in the system.

For example, the third method may be used on a blower system that may be sufficiently accurately characterized using a torque demand equation such as:

$$T = K1 + K2*s + K3*A + K4*s*A^2, \quad (1)$$

In one exemplary embodiment, the particular blower system is characterized so the particular coefficients are obtained. These coefficients may be obtained using conventional techniques such as regression analysis. In another embodiment, the blower system may be characterized using generic coefficients obtained from a reference system that reasonably approximates the particular blower system being run. As techniques for characterizing blower systems are known in the art, they will not be described in further detail.

Once the system is characterized, the airflow may be continuously or periodically estimated using any of the methods described above. Using the third method, the motor speed and torque are estimated using conventional techniques and an initial estimate of airflow may be made. The initial estimate of airflow may be the demand airflow, some percentage of maximum airflow or demand airflow, a previously estimated airflow or any other initial. The third method will converge on an airflow estimate even if a poor estimation is originally made. Torque is calculated using the estimated airflow and motor speed. The calculated torque is compared to the estimated motor torque to obtain a torque error. In one embodiment, the torque error is simply the difference between the estimated motor torque and the torque calculated using the blower system characteristic equation (e.g., equation (1)). The estimated airflow is then revised based on the calculated torque error. One way to revise the airflow is to add a correction factor based on the torque error to the previously estimated airflow. In one embodiment, the correction factor is the torque error multiplied by some constant. Alternatively, the correction factor may be integral or difference sum or a combination of any of these types of factors. The particular correction factor used may be determined by experimentation that is well within the skill of ordinary artisans in this field. Once the airflow estimate is revised, the torque, torque error and correction factor are recalculated until the torque error is within a predetermined acceptable range (e.g., some percentage of maximum torque). As will be appreciated by those skilled in the art, the estimated airflow may be continuously calculated during system operation. Alternatively, the airflow may be estimated periodically as the system runs.

Although various blower system embodiments have been described above, it should be understood that the teachings of this disclosure can also be applied to other types of fluid handling systems, including for example air and liquid pumps without departing from the scope of the present invention.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that several advantages are achieved by the present invention.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of generating a drive signal for a characterized blower system including a motor, a blower driven by the motor, and a blower control that produces a drive signal for the motor using at least one of electric hardware and software, said method comprising:
   (a) generating a drive signal using the blower control and running the motor;
   (b) estimating a torque and a speed of the running motor;
   (c) assuming a starting airflow estimate;
   (d) calculating torque based on the estimated speed and the estimated airflow;
   (e) calculating a torque error as a function of the calculated torque and the estimated torque;
   (f) revising estimated airflow based on the calculated torque error; and
   (g) repeating steps (d) through (f) using the revised estimated airflow until the torque error is within a predetermined acceptable range,
   (h) using the blower control to produce a modified drive signal that decreases an offset between the estimated air flow obtained in step (g) and a demanded air flow.

2. A method as set forth in claim 1 wherein torque is calculated using the equation $T=K1+K2*s+K3*A+K4*s*A^2$, where: T represents the calculated torque demand in Newton meters; s represents the estimated motor speed in revolutions per minute; A represents the estimated airflow demand in cubic feet per minute; and K1, K2, K3 and K4 are predetermined constants based on the characterized blower system.

3. A method as set forth in claim 2 wherein torque error is calculated as a difference between the calculated torque and the estimated torque.

4. A method as set forth in claim 3 wherein estimated airflow is revised by adding the calculated torque error to the previously estimated airflow.

5. A method as set forth in claim 4 wherein estimated airflow is revised by multiplying the calculated torque error by a predetermined gain to obtain a correction factor and adding the correction factor to the previously estimated airflow.

6. A method as set forth in claim 1 wherein torque error is calculated as a difference between the calculated torque and the estimated torque.

7. A method as set forth in claim 6 wherein estimated airflow is revised by adding the calculated torque error to the previously estimated airflow.

8. A method as set forth in claim 7 wherein estimated airflow is revised by multiplying the calculated torque error by a predetermined gain to obtain a correction factor and adding the correction factor to the previously estimated airflow.

9. A method as set forth in claim 1 wherein the starting airflow is assumed to be zero.

10. A method as set forth in claim 1 wherein said method is performed by the motor on first start up.

11. A method as set forth in claim 1 wherein said method is performed by the motor during a test mode.

12. A motor or control adapted to perform the method set forth in claim 1.

13. A method of estimating airflow for a characterized blower system including a motor, a blower driven by the motor, and a blower control that produces a drive signal for the motor using at least one of electric hardware and software, said method comprising:
   (a) running the motor;
   (b) estimating a torque and a speed of the running motor;
   (c) assuming a starting airflow estimate;
   (d) calculating torque based on the estimated speed and the estimated airflow;
   (e) calculating a torque error by subtracting the calculated torque from the estimated torque;
   (f) calculating a correction factor based on the torque error;
   (g) revising estimated airflow by adding the correction factor to the previously estimated airflow; and
   (h) repeating steps (d) through (g) using the revised estimated airflow until the torque error is within a predetermined acceptable range,
   wherein the blower control is adapted to modify the drive signal to decrease an offset between the estimated air flow obtained in step (h) and a demanded air flow.

14. A method as set forth in claim 13 wherein the correction factor is calculated by multiplying the torque error by a preselected gain.

15. A method as set forth in claim 14 wherein the gain is a scalar quantity.

16. A method as set forth in claim 13 wherein the starting airflow is assumed to be zero.

17. A method of estimating flow for a characterized fluid handling system including a motor, a blower driven by the motor, and a blower control that produces a drive signal for the motor using at least one of electric hardware and software, said method comprising:
   running the motor;
   calculating fluid flow based on a torque and a speed of the motor; and
   adjusting the drive signal based on the calculated fluid flow to decrease an offset between the calculated fluid flow and a demanded fluid flow.

18. A method as set forth in claim 17 wherein the calculated fluid flow comprises airflow.

* * * * *